(12) United States Patent
Yang

(10) Patent No.: US 8,887,071 B2
(45) Date of Patent: Nov. 11, 2014

(54) COLLABORATIVE INFORMATION SHARING SYSTEM

(71) Applicant: Eric Yang, San Diego, CA (US)

(72) Inventor: Eric Yang, San Diego, CA (US)

(*) Notice: Subject to any disclaimer, the term of this patent is extended or adjusted under 35 U.S.C. 154(b) by 1 day.

(21) Appl. No.: 13/708,917

(22) Filed: Dec. 7, 2012

(65) Prior Publication Data
US 2014/0164934 A1   Jun. 12, 2014

(51) Int. Cl.
*G06F 3/01* (2006.01)
*G06F 17/30* (2006.01)

(52) U.S. Cl.
CPC .............. *G06F 17/30873* (2013.01)
USPC .......................... 715/753; 715/751

(58) Field of Classification Search
None
See application file for complete search history.

(56) References Cited

U.S. PATENT DOCUMENTS

| | | | | |
|---|---|---|---|---|
| 2002/0083134 | A1* | 6/2002 | Bauer et al. | 709/204 |
| 2004/0059632 | A1* | 3/2004 | Kang et al. | 705/14 |
| 2004/0267871 | A1* | 12/2004 | Pratley et al. | 709/200 |
| 2009/0217177 | A1* | 8/2009 | DeGrazia | 715/753 |
| 2012/0215642 | A1* | 8/2012 | Wong | 705/14.64 |
| 2012/0317501 | A1* | 12/2012 | Milou | 715/753 |

OTHER PUBLICATIONS

Citrix Online, Goto Meeting User Guide, 2010, Version 4.5, http://www.commerce.virginia.edu/technology/howto/documents/gotomeeting_user_guide.pdf.*

* cited by examiner

*Primary Examiner* — Stephen Alvesteffer
*Assistant Examiner* — William Trapanese
(74) *Attorney, Agent, or Firm* — Arc IP Law, PC; Joseph J. Mayo

(57) ABSTRACT

Enables a collaborative information sharing system configured to enable distally located users to quickly, conveniently and simultaneously share information such as images of websites, applications or any other information with each other in real-time, for example to enable multiple distally located users to shop, teach, learn or otherwise view shared information and communicate in a secure and coordinated fashion that is not possible with existing co-browsing or screen sharing technologies.

20 Claims, 4 Drawing Sheets

FIGURE 4

| Host User | Host User | Host User |
|---|---|---|
| Control Bar @@@@ | User1 | User1 |
| User1 @@@@ | Control Bar @@@@ | Control Bar @@@@ |
| User2 @@@@ | User2 @@@@ | User2 @@@@ |
| User3 @@@@ | User3 @@@@ | User3 @@@@ |

COLLABORATIVE INFORMATION SHARING SYSTEM

BACKGROUND OF THE INVENTION

1. Field of the Invention

One or more embodiments of the invention are related to the field of data processing systems and communication systems. More particularly, but not by way of limitation, one or more embodiments of the invention enable a collaborative information sharing system configured to enable distally located users to quickly, conveniently and simultaneously share information such as images of websites, applications or any other information with each other in real-time, for example to enable multiple distally located users to shop, teach, learn or otherwise view shared information and communicate in a secure and coordinated fashion that is not possible with existing co-browsing or screen sharing technologies.

2. Description of the Related Art

Current solutions for sharing information between distal computers include desktop sharing, co-browsing and message boarding. These solutions are limited in that only one person can share information at a time and/or provide full access to information on each computer or website that one or more users may not wish to share.

Desktop sharing is also bandwidth intensive and requires that one person is the host who controls the cursor for the desktop. In addition, sensitive items may be shown on the desktop, or as alerts such as incoming email messages, or may include files or images such as the screen background that the host may not wish for other users to see.

Co-browsing creates a security issue and privacy issue in that each user co-browsing may see a credit card number or other personal information that is input into a web page, and may allow any user that is co-browsing to purchase an item, for example via one-click purchasing that may or may not be intended by the person who is actually shopping.

Message boards require a user to post a message and wait for a response. No matter how fast the response is posted, it is still slower than a typical verbal conversation. When several people are involved in a conversation a chat or message board text sequence may be hard to follow and some users may be ignored if several messages occur in quick succession, which causes frustration on the part of some users.

For example, a typical multi-user shopping scenario occurs that involves two or more distally located users having computers when they attempt to shop together online. In this scenario, they may email links to websites or products, or email images to one another in an attempt to describe potential purchase items that one user is currently viewing. This occurs in situations where a user does not wish to share a screen, or does not have screen sharing software installed or know how to access it, yet needs to share information to discuss in a more time efficient manner than is possible through use of a typical message board or chat session. The resulting communication is inefficient and time consuming, results in confusion as to the location of particular items that a given user is looking at, pointing at, or otherwise describing and requires significant amounts of verbal guiding to ensure that everyone is correctly communicating.

For at least the limitations described above there is a need for a collaborative information sharing system.

BRIEF SUMMARY OF THE INVENTION

One or more embodiments described in the specification enable a collaborative information sharing system. At least one embodiment may be implemented with an application configured to execute on a computer wherein the application is configured to display an interface that includes a shared space on a first computer associated with a first user. The system may accept a capture input from the first user to capture an image of information, for example of an application window instead of capturing or sharing the window as is performed for example with co-browsing. The system may accept a display input from the first user associated with the first computer to display the image of information in the shared space. The system then generally is configured to display the image of information in the shared space. One or more embodiments are configured to transmit the image of information to at least one other computer, for example distally located to the first user. If the first user wishes to point out a particular area of interest for example, the system is configured to accept a first input associated with a first location in the shared space associated with the first computer. The system then may display the first location of the first input in the shared space, for example to show where the user has indicated a point of interest. Embodiments then transmit the first input associated with the first location in the shared space to the at least one other computer. This enables all computers that are associated with the particular collaborative session to display the location of interest according to the first user for example. Embodiments may also receive a second input associated with a second location in the shared space associated with a second computer that is associated with a second user. This enables the second user to also indicate another area of interest for example. Embodiments then may display the second location of the second input from the second computer in the shared space to indicate this second area of interest for all to see for example.

In one or more embodiments, the capture input comprises an "accept" or acceptance of a cursor drag, or a selection of an application window or a file selection. Any other manner of obtaining an image, for example via a touch screen is in keeping with the spirit of the invention. Through use of images instead of actual co-browsed websites or sharing of desktops, low bandwidth streaming may take place since once the image is transferred to other computers, for example after compression, then small amounts of movement data may be interchanged to show cursors or other indicators associated with any or all of the users in the collaborative session. For example, the image of information may include an image of a web page displayed in a web browser, or an image of at least one page displayed in a second application or an image file.

Embodiments may display the first location of the first input via a display of a first cursor that identifies the first user and wherein the display of the second location of the second input includes a display of a second cursor that identifies the second user. This enables multiple users to see the location that each other user is looking at, describing or in any other manner communicating about.

At least one embodiment of the invention is configured to accept a first move input associated with a first move location from the first user as the first user moves the first input. For example when the first user moves the cursor, then the system is configured to move the first location in the shared space to the first move location and display the first move location of the first move input in the shared space. This move for example shows a new cursor location in one or more embodiments. The system may then transmit the first move input associated with the first move location in the shared space to the at least one other computer, for example so that the other computers in the collaborative session may show the first user's cursor at the new location where the first user moved it on the first computer. Embodiments of the system may also receive a second move input associated with a second move location in the shared space associated with the second computer that is associated with said the user, for example to show the second user's moves as well through a display of the second move location of the second move input from the second computer in the shared space.

One or more embodiments may also display a trail between the first location and the first move location in the shared space on one or more computers to highlight the movement for example.

In one or more embodiments, the interface further includes an image queue and the application is further configured to display at least one thumbnail in the image queue wherein the at least one thumbnail represents displayable information that is displayed in the shared space. The system is also configured to accept a thumbnail input from the first computer associated with a first thumbnail and display information in the shared space that corresponds to the first thumbnail. At least one embodiment is configured to transmit the thumbnail input from the first computer associated with the first thumbnail to the at least one other computer. This for example enables any number of images to be switched to the shared space on any or all computers in the session to quickly enable users to discuss multiple images in rapid fashion. In one or more embodiments, the application is further configured to display a name associated with the first user proximally to the at least one thumbnail.

In one or more embodiments, the interface further includes a dialogue box and the application is further configured to accept a first text input from the dialogue box from the first computer associated with the first user and display the first text input in the dialogue box on said first computer. Embodiments then transmit the first text input from the first computer to the at least one other computer, for example to display text based messages or chat messages on any or all other computers in the session.

In one or more embodiments, the interface further includes an ad space view and the application is further configured to accept a first advertisement from a remote server. Embodiments then display the first advertisement in the ad space view on at least the first computer. Alternatively, or in combination, the application is further configured to analyze the image, or metadata associated with the image, such as the location where the image was taken, or the URL of the image, type of image after analysis thereof, or any other characteristic of the image to identify one or more products to advertise and display the one or more products in the ad space view on any or all of the computers in the session. Any image processing algorithm to identify objects in images may be utilized in keeping with the spirit of the invention.

Embodiments of the invention may provide the option of allowing users to either (i) click on an ad in order to display an advertiser's website or enable the users to invite the advertiser into the chat room. This enables the system to embed the ability to invite someone into a chat room within an online advertisement.

In one or more embodiments, the system may analyze a uniform resource locator or URL, for example that the user is viewing or associated with an image as described above, to identify one or more products to advertise and display the one or more products in the ad space view. For example, when a user captures an image from a browser, one or more embodiments of the invention may also save the URL associate the URL with the image displayed in the shared space or thumbnails associated with the image for example.

In one or more embodiments, the interface further includes a dialogue box and the application is further configured to accept a first text input from the dialogue box from the first computer associated with the first user and analyze any combination of one or more inputs including the image or the first text input to identify one or more products to advertise and then display the one or more products in the ad space view.

A private image queue may be provided by the system for the user to upload and prepopulate the private image queue with images or files. Images in the private image queue may be kept in the "cloud" so user can access the images or files at any time from any computer using an embodiment of the invention. In one or more embodiments, the private image queue may not be seen by other users in a chat room. When the user is in a chat room with other users, the user can bring up the private image queue and either assert a button to copy all of the private images into the public image queue or selectively choose images to bring into the public image queue.

At least one embodiment of the application is further configured to allow host User to set a price for admitting other users to enter their chat room. For example a host user may set up a "classroom" with predetermined limits on number of other users allowed to enter based on a price paid to the entity that hosts an embodiment of the invention. The classroom may be advertised and other users may sign up to join. At the scheduled time for the opening of the classroom, users who have signed up to join u enter the classroom and upon staying in the classroom for a predetermined time period, their credit card is automatically charged. The proceeds may be distributed to the host user and the hosting entity for example. Any other method of splitting proceeds between any entities is in keeping with the spirit of the invention One or more embodiments of the invention provide the ability for users to take private notes on the images that are shared by the users. Such notes are not seen by other users within the chat room in one or more embodiments. All notes associated with an image may be printed to PDF or any other format.

A host user Control bar allows host user to universally control what features other users have access to during the chat room session. In one or more embodiments, a series of icons may be displayed by the system next to the user's name wherein the icon represents some feature (i.e. chatting, image capturing, image pointing, inviting other Users, etc.) whereby the host user can enable or disable individually by clicking on the icon next to the user name to control. The host user can also universally change feature controls by clicking on the applicable icon in the control bar, which enables or disables that feature universally to all other users. The host user can also drag and drop another user above the control bar thereby allowing the user above the control bar to act as a second host user so they can assist original host User in controlling other user's abilities to access certain features.

In one or more embodiments, the application is further configured to accept an invitation from the second user associated with the second computer to share information and display a name associated with the second user or the second computer on the first computer in a user list view.

In one or more embodiments, the first computer may be a personal computer, a tablet computer, a mobile phone computer or a television. Any other type of computer that may be programmed or display information may also be utilized in keeping with the spirit of the invention.

In one or more embodiments, the application is further configured to save at least the image of information and the first location and the second location that are displayed in the shared space in memory for later playback. Alternatively, or in combination, the application may be further configured to save all data displayed in the interface in memory for later playback or in a file for later review.

At least one embodiment of the application is further configured to enable the second user to draw in the shared space, move images to the shared space, invite other users and chat based on respective settings asserted by the first user. Any or all settings may be configured in any manner and accepted by the system to set the privileges of any other user for example.

At least one embodiment of the application is further configured to display a uniform resource locator or URL associated with the image of information and accept an input to display a browser window that shows a website at the URL. This enables users to click on the thumbnail or image in the shared space to bring up a local browser to further the collaborative session.

BRIEF DESCRIPTION OF THE DRAWINGS

The above and other aspects, features and advantages of the invention will be more apparent from the following more particular description thereof, presented in conjunction with the following drawings wherein:

FIG. 4 illustrates a host user control bar that enables a host user to universally control the features available to other users during a chat room session.

DETAILED DESCRIPTION OF THE INVENTION

A collaborative information sharing system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
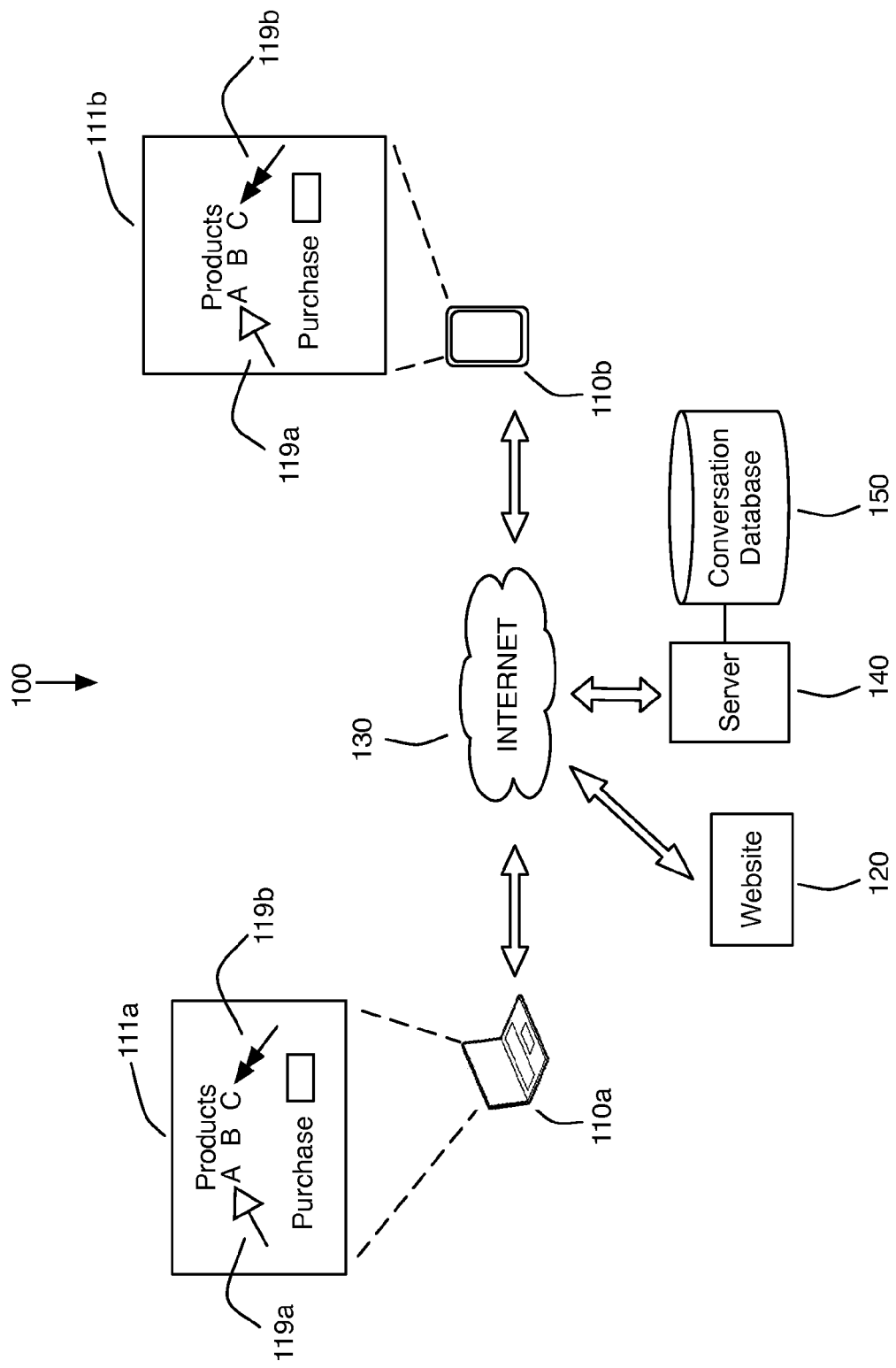
FIG. 1 illustrates an architectural view of at least one embodiment of the collaborative information sharing system.

FIG. 1 illustrates an architectural view of at least one embodiment of the collaborative information sharing system. At least one embodiment may be implemented with an application configured to execute on computer 110a, for example a laptop, wherein the application is configured to display an interface (see FIG. 2) comprising shared space 111a on first computer 110a associated with a first user. The system may accept a capture input from the first user to capture an image of information, for example an image of an application window, by dragging over an area of a screen or window or selecting a file that may have an image or which may be converted to one or more images for example. In one or more embodiments, the image may be captured from a browser window showing website 120 for example. The system may accept a display input from the first user associated with the first computer to display the image of information in the shared space, for example by releasing the mouse button or clicking on a thumbnail or in any other manner asserting the particular image to display. The system then generally is configured to display the image of information in the shared space. One or more embodiments are configured to transmit the image of information to at least one other computer 110b, for example distally located to the first user and in one or more embodiment over a computer network such as Internet 130. If the first user wishes to point out a particular area of interest for example, the system is configured to accept a first input associated with a first location in the shared space associated with the first computer. The system then may display the first location of the first input in the shared space, for example to show where the user has indicated a point of interest, such as with cursor 119a. Embodiments then transmit the first input associated with the first location in the shared space to the at least one other computer. This enables all computers that are associated with the particular collaborative session to display the location of interest according to the first user for example. Embodiments may also receive a second input associated with a second location in the shared space associated with a second computer that is associated with a second user. This enables the second user to also indicate another area of interest for example, such as with cursor 119b. Embodiments then may display the second location of the second input from the second computer in the shared space 111b and for example 111a to indicate this second area of interest for all to see for example. In one or more embodiments, server 140 may include user names or email addresses of users that wish to collaborate or that are in collaboration and save any portion or all information from the collaborative session in conversation database 150 for example.

In one or more embodiments, the capture input comprises an "accept" or acceptance of a cursor drag, or a selection of an application window or a file selection. In one or more embodiments, images may be captured on a touch screen by asserting a capture icon and dragging corners of a capture frame to place a capture frame target window over an area of the screen. In one or more embodiments, asserting a control key or double click or any other input such as moving an accelerometer based phone or tablet computer to assert a capture may be utilized. Any other manner of obtaining an image is in keeping with the spirit of the invention. Through use of images instead of actual co-browsed websites or sharing of desktops, low bandwidth streaming may take place since once the image is transferred to other computers, for example after compression, then small amounts of movement data may be interchanged to show cursors or other indicators associated with any or all of the users in the collaborative session. For example, the image of information may include an image of a web page displayed in a web browser, or an image of at least one page displayed in a second application or an image file. The image is sent for example over Internet 130 from computer 110a to any number of other computers, such as computer 110b for example. In one or more embodiments of the invention, the application may be downloaded from server 140 or may be downloaded as a web application from website 120 for example Embodiments may display of the first location of the first input via a display of first cursor 119a that identifies the first user, as shown a single hollow triangular cursor, but which may also include a name or handle for example as one skilled in the art will appreciate. The display of the second location of the second input includes a display of second cursor 119b that identifies the second user as shown a double filled triangular cursor, which may be any type of cursor including the same as cursor 119a with other identifying information such as a color assigned to each cursor that identifies the different users, or with a text based name proximal to each cursor. This enables multiple users to see where each other user is looking at, describing or in any other manner communicating about. Any manner in which cursors may be identified with particular users is in keeping with the spirit of the invention.

Figure 2:
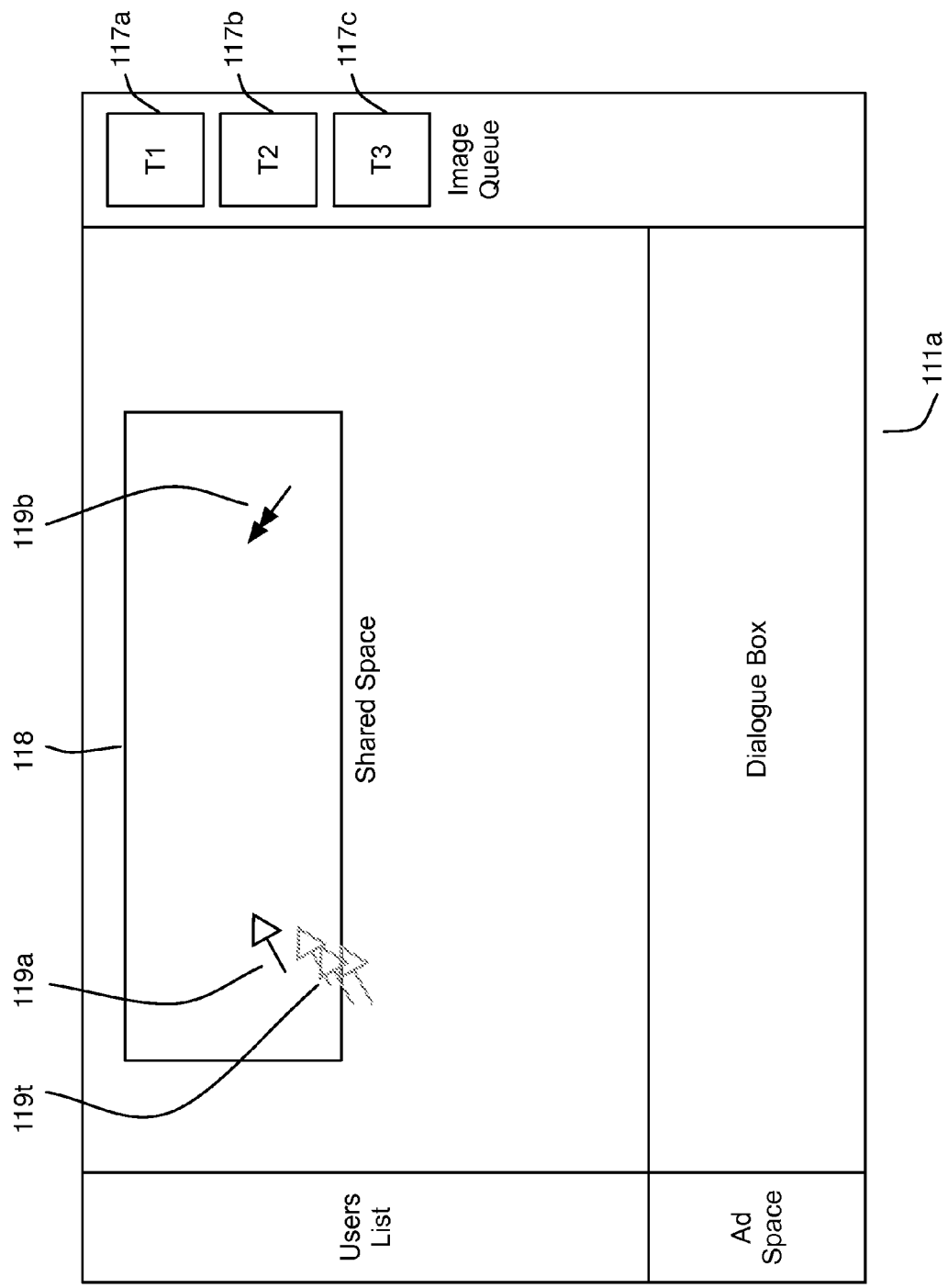
FIG. 2 illustrates a logical view of an exemplary interface of the collaborative information sharing system.

FIG. 2 illustrates a logical view of an exemplary interface of the collaborative information sharing system. At least one embodiment of the invention is configured to accept a first move input associated with a first move location from the first user as the first user moves the first input. For example when the first user moves the cursor, then the system is configured to move the first location in the shared space to the first move location and display the first move location of the first move input in the shared space. This move for example shows a new cursor location in one or more embodiments. The system may then transmit the first move input associated with the first move location in the shared space to the at least one other computer, for example so that the other computers in the collaborative session may show the first user's cursor at the new location where the first user moved it on the first computer. Embodiments of the system may also receive a second move input associated with a second move location in the shared space associated with the second computer that is associated with said the user, for example to show the second user's moves as well through a display of the second move location of the second move input from the second computer in the shared space. One or more embodiments may also display trail 119t between the first location and the first move location in the shared space on one or more computers to highlight the movement for example.

In one or more embodiments, the interface further includes an image queue, shown on the right side of the interface in FIG. 2, and the application is further configured to display at least one thumbnail 117a-c in the image queue wherein the at least one thumbnail represents displayable information that is displayed in the shared space. The system is also configured to accept a thumbnail input from the first computer associated with a first thumbnail, e.g., 117a and display information 118, for example an image an optional URL, in the shared space that corresponds to the first thumbnail. At least one embodiment is configured to transmit the thumbnail input from the first computer associated with the first thumbnail to the at least one other computer for example over Internet 130, either via server 140 or directly to computer 110b for example. This for example enables any number of images to be switched to the shared space on any or all computers in the session to quickly enable users to discuss multiple images in rapid fashion. In one or more embodiments, the application is further configured to display a name associated with the first user proximally to the at least one thumbnail, for example where "Image Queue" is shown for the third thumbnail, or alternatively over the thumbnail. In one or more embodiments, the user name may be displayed only when a cursor is over the thumbnail for example.

In one or more embodiments, the interface further includes a dialogue box, shown on the bottom of the interface, and the application is further configured to accept a first text input from the dialogue box from the first computer associated with the first user and display the first text input in the dialogue box on said first computer. Embodiments then transmit the first text input from the first computer to the at least one other computer, for example to display text based messages or chat messages on any or all other computers in the session. In one or more embodiments of the invention, the text message may be an SMS text message that is sent over a phone network, or a text message sent over a computer network such as Internet 130. One or more embodiments of the dialogue box may include a video chat window that shows video from one or more users in the collaborative session for example.

In one or more embodiments, the interface further includes an ad space view, shown in the lower left of the interface, and the application is further configured to accept a first advertisement from a remote server, such as server 140 for example. The ads may be based on the user profiles or alternatively based on inputs or images accepted by the system. Embodiments then display the first advertisement in the ad space view on at least the first computer. Alternatively, or in combination, the application is further configured to analyze the image or metadata associated with the image, such as the location where the image was taken, or the URL of the image, type of image after analysis thereof, or any other characteristic of the image to identify one or more products to advertise and display the one or more products in the ad space view on any or all of the computers in the session. This enables up selling or cross selling or otherwise targeting similar products at individuals utilizing the collaborative system to aid in their communication. Any image processing algorithm to identify objects in images may be utilized including but not limited to the teachings of U.S. Pat. No. 6,404,920, filed 13 Nov. 1997, the specification of which is incorporated herein by reference. Any other image algorithm that may detect objects such as products, or type of image such as snow, beach, skiing, sailing, or other types of images, is in keeping with the spirit of the invention. Location metadata associated with an image, i.e., that may be stored by a camera via GPS in metadata associated with the image may be utilized to provide geographically relevant products, i.e., sun tan location in the tropics, or sweaters in colder environments, etc.

Embodiments of the invention may provide the option of allowing users to either (i) click on an ad in order to display an Advertiser's website or enable the Users to invite the advertiser into the chat room. This enables the system to embed the ability to invite someone into a chat room within an online advertisement.

In one or more embodiments, the system may analyze a uniform resource locator or URL, for example that the user is viewing or associated with an image as described above, to identify one or more products to advertise and display the one or more products in the ad space view. For example, when a user captures an image from a browser, one or more embodiments of the invention may also save the URL associate the URL with the image displayed in the shared space or thumbnails associated with the image for example.

In one or more embodiments, the interface further includes a dialogue box and the application is further configured to accept a first text input from the dialogue box from the first computer associated with the first user and analyze any combination of one or more inputs including the image or the first text input to identify one or more products to advertise and then display the one or more products in the ad space view.

In one or more embodiments, the interface further includes a user list view shown in the upper right of the interface, and the application is further configured to accept an invitation from the second user associated with the second computer to share information and display a name associated with the second user or the second computer on the first computer in the user list view. Selecting users from the list may then invite the users via text message, email, social network or in any other manner to join the collaborative session by executing the application on their local computer with an identifier for the session which may include the user name of the person that started the collaborative session, or any other user or name associated with the collaborative session for example.

Figure 3:
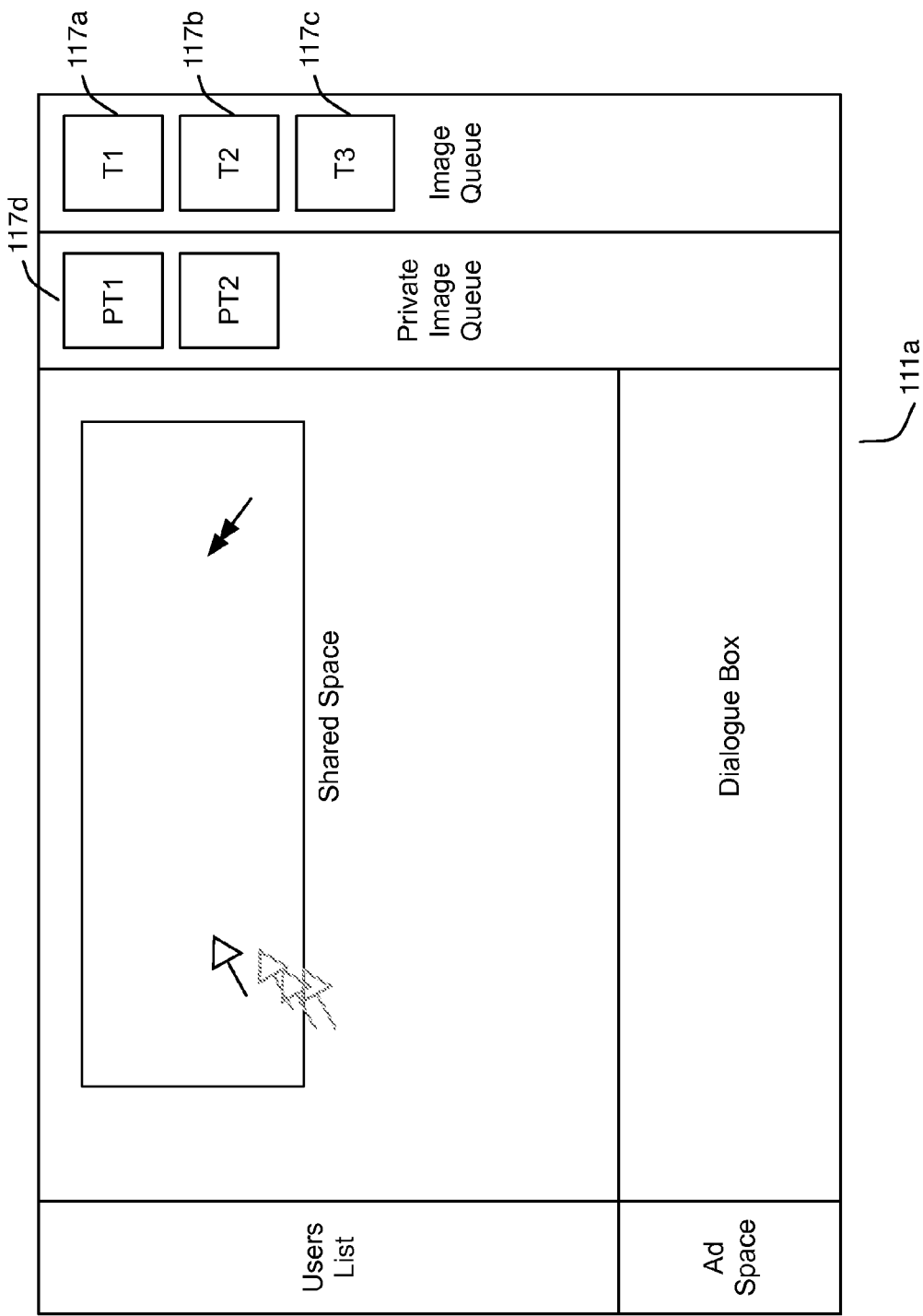
FIG. 3 illustrates an embodiment of the invention that implements a private image queue.

FIG. 3 illustrates an embodiment of the invention that implements a private image queue, for example showing private thumbnail 117d, may be provided by the system for the user to upload and prepopulate the private image queue with images or files. Images in the private image queue may be kept in the "cloud" so user can access the images or files at any time from any computer using an embodiment of the invention. In one or more embodiments, the private image queue may not be seen by any other users in a chat room. When the user is in a chat room with other users, the user can bring up the private image queue and either assert a button to copy all of the private images into the public image queue or selectively choose images to bring into the public image queue. In one or more embodiments, icons may be selected and a drag of the icon may be accepted by the system to move the image to the public queue for example.

At least one embodiment of the application is further configured to allow host User to set a price for admitting other users to enter their chat room. For example a host user may set up a "classroom" with predetermined limits on number of other users allowed to enter based on a price paid to the entity that hosts an embodiment of the invention. The classroom may be advertised and other users may sign up to join. At the scheduled time for the opening of the classroom, users who have signed up to join enter the classroom and upon staying in the classroom for a predetermined time period, their credit card is automatically charged. The proceeds may be distributed to the host user and the hosting entity for example. Any other method of splitting proceeds between any entities is in keeping with the spirit of the invention. In one or more embodiments, server 140 may accept payments from users that enter payment information on computer 110a or 110b as shown in FIG. 1 for example.

One or more embodiments of the invention provide the ability for users to take private notes on the images that are shared by the users. Such notes are not seen by other users within the chat room in one or more embodiments. All notes associated with an image may be printed to PDF or any other format.

FIG. 4 illustrates a host user control bar that enables a host user to universally control the features available to other users during a chat room session. In one or more embodiments, a series of icons ("@" in table below) may be displayed by the system next to the user's name wherein the icon represents some feature (i.e. chatting, image capturing, image pointing, inviting other Users, etc.) whereby the host user can enable or disable individually by clicking on the icon next to the user name to control. The host user can also universally change feature controls by clicking on the applicable icon in the control bar, which enables or disables that feature universally to all other users. The host user can also drag and drop another user above the control bar thereby allowing the user above the control bar to act as a second host user so they can assist original host User in controlling other user's abilities to access certain features. As shown, the first host user has all icons disabled except for the last one, shown in bold typeface. The host user selects this by clicking on the last icon (bolded) that he desired to allow other Users in the chat room to continue accessing. In the second column, that host user has dragged user1 above the Control Bar thereby allowing user1 to make changes to the Control Bar. Here user1 has clicked on the $4^{th}$ icon in the Control Bar thereby allowing all other Users below to access the feature represented by the $4^{th}$ icon (both of the last two icons are shown in bold typeface). In the far right column, both host user and user1 still also have the option to individually change accessible features on an individual basis. Here, User1 has clicked on the $3^{rd}$ icon for User2 so that only User2, among Users below the Control Bar, has access to feature represented by the $3^{rd}$ icon shown with the last three icons in bold typeface. Any other methodology for setting and controlling various users features by other users is in keeping with the spirit of the invention.

In one or more embodiments, the first computer may be a personal computer, a tablet computer, a mobile phone computer or a television. Any other type of computer that may be programmed or display information may also be utilized in keeping with the spirit of the invention.

In one or more embodiments, the application is further configured to save at least the image of information and the first location and the second location that are displayed in the shared space in memory for later playback. Alternatively, or in combination, the application may be further configured to save all data displayed in the interface in memory for later playback or in a file for later review. The sessions may be saved in conversation database 150 for example or locally on computer 110a or 110b or in any combination thereof for example.

At least one embodiment of the application is further configured to enable the second user to draw in the shared space, move images to the shared space, invite other users and chat based on respective settings asserted by the first user. Any or all settings may be configured in any manner and accepted by the system to set the privileges of any other user for example. Any type of drawing tools including for example lines, ellipses, icons, or any other type of drawing shape may be utilized in keeping with the spirit of the invention.

At least one embodiment of the application is further configured to display a uniform resource locator or URL associated with the image of information and accept an input to display a browser window that shows a website at the URL. This enables users to click on the thumbnail or image in the shared space to bring up a local browser to further the collaborative session. For example if click-shifting with cursor 119a, then a local web browser is opened with the URL associated with information 118 for example. This enables users to work offline to create images to share and collaborate on.

While the invention herein disclosed has been described by means of specific embodiments and applications thereof, numerous modifications and variations could be made thereto by those skilled in the art without departing from the scope of the invention set forth in the claims.

What is claimed is:

1. A collaborative information sharing system comprising:
a processor configured to execute an application on a computer, wherein said application is configured to
display an interface comprising a shared space on a first computer associated with a first user;
accept a capture input from said first user to capture a static snapshot of an image of information associated with an image of a web page or
an image of at least one page displayed in a second application or an image of a file;
accept a display input from said first user associated with said first computer to display said static snapshot of said image of information in said shared space;
display said static snapshot of said image of information in said shared space;
transmit said static snapshot of said image of information to at least one other computer without sharing access to
said web page or
said second application or
said file
by anyone other than said first user;
accept a first input associated with a first location in said shared space associated with said first computer;

display said first location of said first input in said shared space comprising a display of a first cursor that identifies said first user wherein said display of said first input is displayed on said static snapshot of said image of information associated with
    said image of said web page or
    said image of at least one page displayed in said second application or
    said image of said file,
without sharing said first input with
    said web page or
    said second application or
    said file;
transmit said first input associated with said first location in said shared space to said at least one other computer;
receive a second input associated with a second location in said shared space associated with a second computer that is associated with a second user;
display said second location of said second input from said second computer in said shared space comprising a display of a second cursor that identifies said second user wherein said display of said second input is displayed on said static snapshot of said image of information associated with
    said image of said web page or
    said image of at least one page displayed in said second application or
    said image of said file,
without sharing said second input with
    said web page or
    said second application or
    said file; and,
display a host user control bar, wherein said host user control bar is configured to allow a host user to universally and individually control one or more features of said shared space available to one or more other users within said shared space,
    such that said host user enables or disables one or more features universally by clicking on one or more feature icons in said host user control bar to enable or disable one or more features accessible by all of said one or more users, and enables or disables one or more features individually by clicking one or more feature icons next to user names of each of said one or more other users to allow said one or more users to access only said one or more features made available to them by said host user, and,
    such that said host user allows one or more of said other users to act as a second host user by dragging and dropping one or more names of said one or more other users above said host user control bar.

2. The collaborative information sharing system of claim 1, wherein said accept said capture input comprises an accept of a cursor drag, or a selection of an application window or a file selection.

3. The collaborative information sharing system of claim 1, wherein said application is further configured to
    accept a first move input associated with a first move location from said first user as said first user moves said first input;
    move said first location in said shared space to said first move location;
    display said first move location of said first move input in said shared space;
    transmit said first move input associated with said first move location in said shared space to said at least one other computer;
    receive a second move input associated with a second move location in said shared space associated with said second computer that is associated with said second user;
    display said second move location of said second move input from said second computer in said shared space.

4. The collaborative information sharing system of claim 3, wherein said application is further configured to
    display a trail between said first location and said first move location in said shared space.

5. The collaborative information sharing system of claim 1, wherein said interface further comprises an image queue and wherein said application is further configured to
    display at least one thumbnail in said image queue wherein said at least one thumbnail represents displayable information that is displayed in said shared space;
    accept a thumbnail input from said first computer associated with a first thumbnail;
    display information in said shared space that corresponds to said first thumbnail;
    transmit said thumbnail input from said first computer associated with said first thumbnail to said at least one other computer.

6. The collaborative information sharing system of claim 5, wherein said application is further configured to display a name associated with said first user proximally to said at least one thumbnail.

7. The collaborative information sharing system of claim 1, wherein said interface further comprises a dialogue box and wherein said application is further configured to
    accept a first text input from said dialogue box from said first computer associated with said first user;
    display said first text input in said dialogue box on said first computer;
    transmit said first text input from said first computer to said at least one other computer.

8. The collaborative information sharing system of claim 1, wherein said interface further comprises an ad space view and wherein said application is further configured to
    accept a first advertisement from a remote server;
    display said first advertisement in said ad space view on said first computer.

9. The collaborative information sharing system of claim 8, wherein said application is further configured to allow said one or more users to click on said first advertisement in said ad space to enable said one or more users to invite an advertiser of said first advertisement into a chat room of said shared space.

10. The collaborative information sharing system of claim 1, wherein said interface further comprises an ad space view and wherein said application is further configured to
    analyze said image to identify one or more products to advertise;
    display said one or more products in said ad space view.

11. The collaborative information sharing system of claim 1, wherein said interface further comprises an ad space view and wherein said application is further configured to
    analyze a uniform resource locator or URL to identify one or more products to advertise;
    display said one or more products in said ad space view.

12. The collaborative information sharing system of claim 1, wherein said interface further comprises a dialogue box and an ad space view and wherein said application is further configured to accept a first text input from said dialogue box from said first computer associated with said first user;

analyze any combination of one or more inputs including said image or said first text input to identify one or more products to advertise;

display said one or more products in said ad space view.

13. The collaborative information sharing system of claim 1, wherein said interface further includes a user list view and wherein said application is further configured to accept an invitation from said second user associated with said second computer to share information;

display a name associated with said second user or said second computer on said first computer in said user list view.

14. The collaborative information sharing system of claim 1, wherein said first computer is a personal computer, a tablet computer, a mobile phone computer or a television.

15. The collaborative information sharing system of claim 1, wherein said application is further configured to save at least said image of information and said first location and said second location that are displayed in said shared space in memory for later playback.

16. The collaborative information sharing system of claim 1, wherein said application is further configured to save all data displayed in said interface in memory for later playback or in a file for later review.

17. The collaborative information sharing system of claim 1, wherein said application is further configured to enable said second user to draw in said shared space, move images to said shared space, invite other users and chat based on respective settings asserted by said first user.

18. The collaborative information sharing system of claim 1, wherein said application is further configured to display a uniform resource locator or URL associated with said image of information and accept an input to display a browser window that shows a website at said URL.

19. A collaborative information sharing system comprising:

a processor configured to execute an application on a computer, wherein said application is configured to display an interface comprising a shared space on a first computer associated with a first user wherein said first computer is a personal computer, a tablet computer, a mobile phone computer or a television;

accept a capture input from said first user to capture comprising a cursor drag, or a selection of an application window, or a file selection to capture a static snapshot of an image of information associated with an image of a web page displayed in a web browser, or an image of at least one page displayed in a second application or an image file;

accept a display input from said first user associated with said first computer to display said static snapshot of said image of information in said shared space;

display said static snapshot of said image of information in said shared space;

transmit said static snapshot of said image of information to at least one other computer without sharing access to said web page or
said second application or
said file by anyone other than said first user;

accept a first input associated with a first location in said shared space associated with said first computer;

display said first location of said first input in said shared space comprising display of a first cursor that identifies said first user wherein said display of said first input is displayed on said static snapshot of said image of information associated with said image of said web page or
said image of at least one page displayed in said second application or
said image of said file, without sharing said first input with
said web page or
said second application or
said file;

transmit said first input associated with said first location in said shared space to said at least one other computer;

receive a second input associated with a second location in said shared space associated with a second computer that is associated with a second user;

display said second location of said second input from said second computer in said shared space comprising a display of a second cursor that identifies said second user wherein said display of said second input is displayed on said static snapshot of said image of information associated with said image of said web page or
said image of at least one page displayed on said second application or
said image of said file, without sharing said second input with
said web page or
said second application or
said file;

accept a first move input associated with a first move location from said first user as said first user moves said first input;

move said first location in said shared space to said first move location;

display said first move location of said first move input in said shared space;

transmit said first move input associated with said first move location in said shared space to said at least one other computer;

receive a second move input associated with a second move location in said shared space associated with said second computer that is associated with said second user;

display said second move location of said second move input from said second computer in said shared space and optionally display a trail between said first location and said first move location in said shared space;

wherein said interface further comprises an image queue and wherein said application is further configured to display at least one thumbnail in said image queue wherein said at least one thumbnail represents displayable information that is displayed in said shared space and optionally display a name associated with said first user proximally to said at least one thumbnail wherein said thumbnail is displayed in a public queue or private queue;

accept a thumbnail input from said first computer associated with a first thumbnail;

display information in said shared space that corresponds to said first thumbnail;

transmit said thumbnail input from said first computer associated with said first thumbnail to said at least one other computer;

wherein said interface further comprises a dialogue box and wherein said application is further configured to
accept a first text input from said dialogue box from said first computer associated with said first user;
display said first text input in said dialogue box on said first computer;
transmit said first text input from said first computer to said at least one other computer;

wherein said interface further comprises an ad space view and wherein said application is further configured to
accept a first advertisement from a remote server
or
analyze any combination of one or more inputs including said image or said first text input to identify one or more products to advertise;
display said first advertisement in said ad space view on said first computer;
enable said second user to draw in said shared space, move images to said shared space, invite other users and chat based on respective settings asserted by said first user;
save at least said static snapshot of said image of information and said first location and said second location that are displayed in said shared space in memory for later playback
or
save all data displayed in said interface in memory for later playback or in a file for later review; and display a host user control bar, wherein said host user control bar is configured to allow a host user to universally and individually control one or more features of said shared space available to one or more other users within said shared space,
such that said host user enables or disables one or more features universally by clicking on one or more feature icons in said host user control bar to enable or disable one or more features accessible by all of said one or more users, and enables or disables one or more features individually by clicking one or more feature icons next to user names of each of said one or more other users to allow said one or more users to access only said one or more features made available to them by said host user, and,
such that said host user allows one or more of said other users to act as a second host user by dragging and dropping one or more names of said one or more other users above said host user control bar.

20. The collaborative information sharing system of claim 19, wherein said application is further configured to allow said one or more users to click on said first advertisement in said ad space to enable said one or more users to invite an advertiser of said first advertisement into a chat room of said shared space.

* * * * *